(12) United States Patent
Huang et al.

(10) Patent No.: US 8,891,601 B2
(45) Date of Patent: Nov. 18, 2014

(54) APPARATUS AND METHOD FOR START-UP IN COMMUNICATION SYSTEM

(75) Inventors: Liang-Wei Huang, Taipei (TW); Ta-Chin Tseng, Taipei County (TW); Ting-Fa Yu, Yunlin County (TW); Lie Way Fang, Taichung County (TW); Shieh-Hsing Kuo, Taipei County (TW)

(73) Assignee: Realtek Semiconductor Corp., Hsinchu (TW)

( * ) Notice: Subject to any disclaimer, the term of this patent is extended or adjusted under 35 U.S.C. 154(b) by 1291 days.

(21) Appl. No.: 12/552,269

(22) Filed: Sep. 1, 2009

(65) Prior Publication Data

US 2010/0054315 A1  Mar. 4, 2010

Related U.S. Application Data

(60) Provisional application No. 61/093,707, filed on Sep. 2, 2008.

(51) Int. Cl.
| H04B 1/38 | (2006.01) |
| H04L 5/16 | (2006.01) |
| H04B 3/32 | (2006.01) |
| H04B 3/23 | (2006.01) |

(52) U.S. Cl.
CPC ... *H04B 3/32* (2013.01); *H04B 3/23* (2013.01)
USPC .......................................................... 375/222

(58) Field of Classification Search
USPC .......................................................... 375/222
See application file for complete search history.

(56) References Cited

U.S. PATENT DOCUMENTS

| 5,922,052 A * | 7/1999 | Heaton .......................... 709/223 |
| 2002/0012152 A1 | 1/2002 | Agazzi et al. |
| 2005/0036576 A1* | 2/2005 | Agazzi et al. .................. 375/348 |
| 2006/0256849 A1* | 11/2006 | Tseng et al. ................... 375/232 |
| 2007/0133719 A1* | 6/2007 | Agazzi et al. .................. 375/341 |
| 2009/0257534 A1* | 10/2009 | Wu ................................ 375/344 |
| 2009/0296791 A1* | 12/2009 | Agazzi et al. .................. 375/220 |

FOREIGN PATENT DOCUMENTS

WO      0028691      5/2000

* cited by examiner

*Primary Examiner* — Tanmay Shah
(74) *Attorney, Agent, or Firm* — McClure, Qualey & Rodack, LLP

(57) ABSTRACT

A transceiver in a communication system and a start-up method thereof are provided. The transceiver comprises an auto-negotiation circuit, a timing recovery circuit, an interference cancellation circuit and an equalizer. The auto-negotiation circuit performs an auto-negotiation procedure to determine whether the transceiver operates as a master or slave transceiver. If the transceiver operates as a slave transceiver, it executes a first stage and a second stage during the start-up process. In the first stage, the transceiver performs channel estimation to generate a channel estimation value, presets the parameters of the equalizer according to the channel estimation value, and trains the timing recovery circuit and the equalizer; in the second stage, the transceiver trains the interference cancellation circuit.

27 Claims, 8 Drawing Sheets

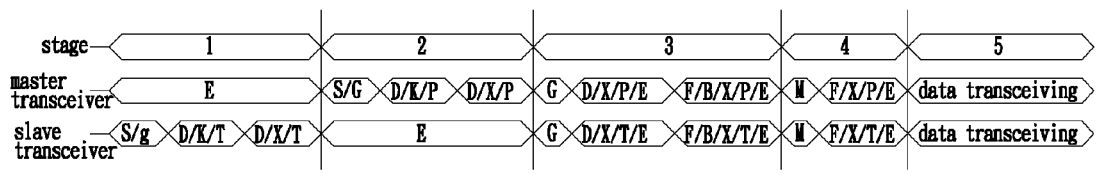

S: signal detection & channel estimation
F: training FFE & DAGC 362
B: truncating FBE parameter & stopping its update
D: training DFE
P: training phase loop
T: training frequency loop & phase loop
E: training echo canceller & NEXT canceller
X: training FEXT canceller
G: training AAGC, DAGC 362 & DAGC 33
g: training AAGC & DAGC 362
K: de-skew
M: enabling Modulo circuit & THP circuit, disabling FBE

FIG.5

APPARATUS AND METHOD FOR START-UP IN COMMUNICATION SYSTEM

CROSS REFERENCE TO RELATED APPLICATIONS

This application claims the benefit of U.S. Provisional Application No. 61/093,707, filed on Sep. 2, 2008 and entitled "Communication System Architecture and Start-Up Procedure Thereof", the contents of which are incorporated herein.

BACKGROUND OF THE INVENTION (a). Field of the Invention

The present invention relates to communication systems, and more particularly to a start-up procedure of a communication system.

(b). Description of the Prior Arts

In a general communication system, in order to correctly receive data in the receiving side, functional blocks of the receiver usually are trained. In the start-up procedure of the communication system, lots of parameters of the functional blocks need to be properly configured so as to make the receiver receive the data correctly. In order to properly configure these parameters, the known signals issued from the transmitting side are needed, i.e. in a data-directed manner, so as to enable the receiver to progressively find the proper parameters for the functional blocks.

However, in some communication systems, e.g. IEEE 802.3ab (i.e. 1000 Base-T) or IEEE 802.3an (i.e. 10G Base-T) Ethernet, the parameters of the functional blocks are trained in a decision-directed manner to get the proper parameters. Nonetheless, the functional blocks may operate to influence each other such that the parameters of the functional blocks can not converge to proper values in the training process and thus the receiver can not correctly receive the signals transmitted from the transmitter. Therefore, the transceivers in these communication system need a start-up method to rapidly and stably train the related functional blocks in their receivers, so as to assure that the receivers can correctly receive the data transmitted from the transmitter of the other side.

Besides, Ethernet is a communication system which follows the IEEE 802.3ab or IEEE 802.3an standard having a master-slave architecture in the start-up procedure, wherein four pairs of transceivers perform communication simultaneously. Each pair of transceivers includes one master transceiver and one slave transceiver, and performs communication via a channel. Since the transmission and reception of signals are performed simultaneously in the same channel, a transceiver will receive the signal transmitted by a far-end transceiver and the echo signal resulted from the transmission signal of the transceiver itself. Besides, since the IEEE 802.3ab or IEEE 802.3an Ethernet performs data transmission via four channels simultaneously, the transceiver for one channel will further receive the cross-talks resulted from the transmission signals within other three channels, as shown in FIG. 1. FIG. 1 shows four pairs of transceivers, where each transceiver includes a transmitter TX, a receiver RX and a hybrid circuit. For each transceiver (the transceiver 11 are taken as example in FIG. 1), in addition to the transmission signal from the transmitter of the far-end transceiver 12, the receiver also receives the echo resulted from the transmission signal of the own transmitter, the near-end cross talks (NEXT) resulted from the transmission signals of the transmitters of the other near-end transceivers 13, 14 and 15, and the far-end cross talks (FEXT) resulted from the transmission signals of the transmitters of the other far-end transceivers 16, 17 and 18. In particular, in the IEEE 802.3an Ethernet standard, the transmission rate is largely increased to near the transmission capability limit of the channel, so the far-end cross talks are significant and need an effective mechanism to do cancellation. In sum, since at least one of the interferences such as echoes, near-end cross talks and far-end cross talks impact the performance of data reception of the transceiver, it would be an important issue about how to train the interference cancellers in the transceiver during the start-up procedure of the transceiver so as to get the proper parameters within a predetermined period of time.

SUMMARY OF THE INVENTION

It is therefore one objective of the present invention to provide a transceiver in a communication system and a start-up method thereof which can rapidly and stably train the related functional blocks in a receiver of the transceiver, so as to assure that the receiver can correctly receive the data transmitted from a transmitter of the other side.

Another objective of the present invention is to provide a transceiver in a communication system and a start-up method thereof which can perform a corresponding start-up procedure according to what communication specification is used and whether the transceiver operates as a master or slave transceiver, both of which can be determined by an auto-negotiation procedure between two communicating sides in the communication system.

In one embodiment of the present invention, a transceiver in a communication system is provided. The transceiver comprises: a timing recovery circuit, an interference cancellation circuit, and an equalizer; and an auto-negotiation circuit to perform an auto-negotiation procedure to determine whether the transceiver operates as a master or slave transceiver; wherein if the transceiver operates as the slave transceiver, the transceiver executes a first stage and a second stage when starting up; in the first stage, the transceiver performs channel estimation to preset at least one parameter of the equalizer, and trains the timing recovery circuit and the equalizer to adjust parameters of the timing recovery circuit and the equalizer; in the second stage, the transceiver trains the interference cancellation circuit to adjust at least one parameter of the interference cancellation circuit; wherein the first stage is before the second stage.

In another embodiment of the invention, a transceiver in a communication system is provided. The transceiver comprises: a timing recovery circuit, an interference cancellation circuit, and an equalizer; and an auto-negotiation circuit to perform an auto-negotiation procedure to determine whether the transceiver operates as a master or slave transceiver; wherein if the transceiver operates as a master transceiver, the transceiver executes a first stage and a second stage when starting up; in the first stage, the transceiver trains the interference cancellation circuit; in the second stage, the transceiver performs channel estimation to preset at least one parameter of the equalizer, and trains the timing recovery circuit and the equalizer to adjust parameters of the timing recovery circuit and the equalizer; wherein the first stage is before the second stage.

In another embodiment of the invention, a start-up method used in a transceiver of a communication system is provided. The transceiver comprises a timing recovery circuit, an interference cancellation circuit and an equalizer. The start-up method comprises: performing an auto-negotiation procedure to determine whether the transceiver operates as a master or slave transceiver; executing following steps if the transceiver operates as the slave transceiver: executing a first stage in which the timing recovery circuit and the equalizer are trained and de-skew is performed to eliminate skew between input signals of the transceiver and another transceiver; and executing a second stage in which the interference cancellation circuit is trained; and executing following steps if the transceiver operates as the master transceiver: executing the first stage in which the interference cancellation circuit is trained; and executing the second stage in which the timing recovery circuit and the equalizer are trained and de-skew is performed to eliminate skew between input signals of the transceiver and another transceiver; wherein the first stage is before the second stage.

In another embodiment of the invention, a transceiver having at least two different start-up procedures for supporting at least two different protocols is provided. The transceiver comprises: a timing recovery circuit, an interference cancellation circuit, and an equalizer; and an auto-negotiation circuit to perform an auto-negotiation procedure to determine which one of the at least two different protocols is used and whether the transceiver operates as a master or slave transceiver; wherein the transceiver performs one of the at least two different start-up procedures according to which one of the at least two different protocols is used and whether the transceiver operates as the master or slave transceiver determined by the auto-negotiation procedure.

BRIEF DESCRIPTION OF THE DRAWINGS

FIG. 5 shows another embodiment of the start-up procedure performed by the communication system in FIG. 2 according to the present invention.

DETAILED DESCRIPTION OF THE INVENTION

Figure 1:
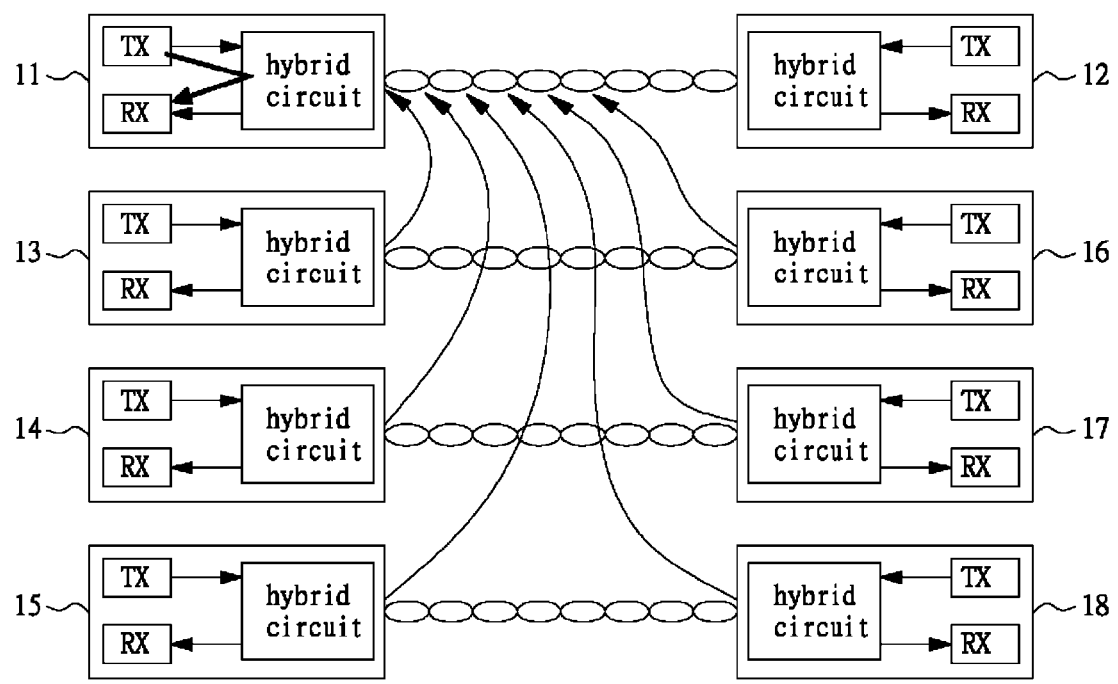
FIG. 1 shows the echo, near-end cross talk and far-end cross talk generated in a communication system.
Figure 2:
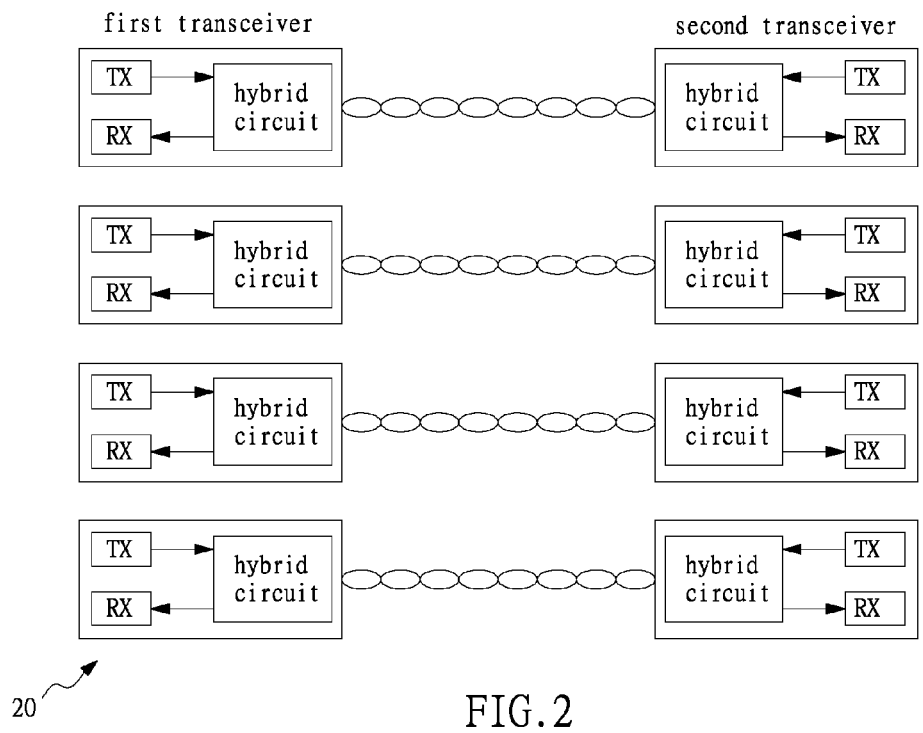
FIG. 2 is a block diagram of an embodiment of a communication system according to the present invention.
Figure 3:
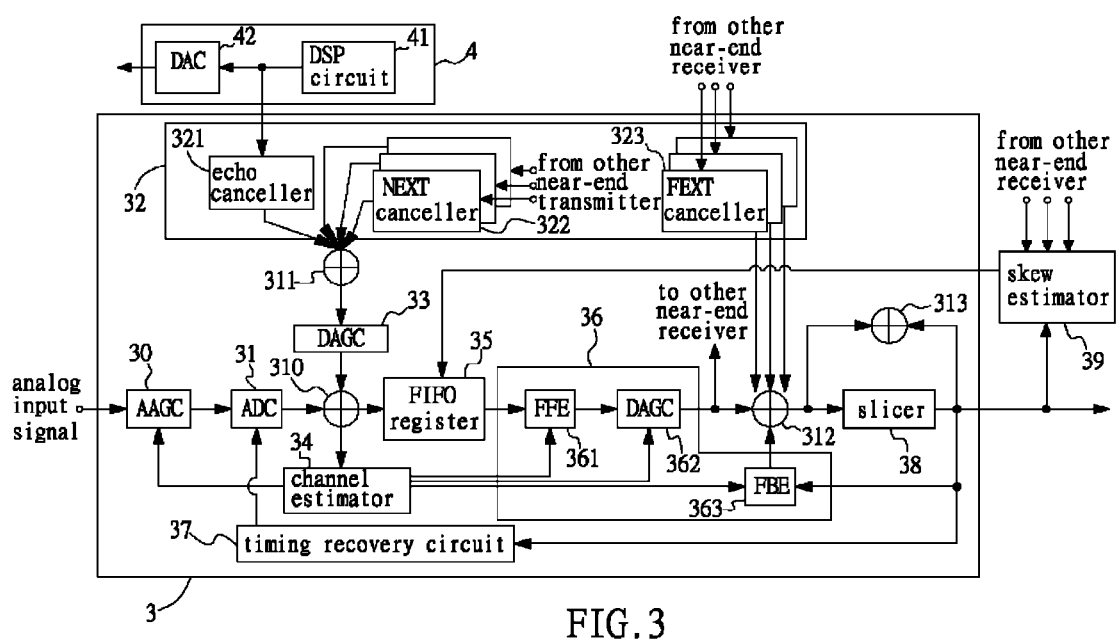
FIG. 3 is a diagram showing the architecture within each transceiver of the communication system in FIG. 2.

FIG. 2 is a block diagram of an embodiment of a communication system according to the present invention, where the communication system 20 is a multi-channel communication system and comprises plural pairs of first and second transceivers (four pairs are shown in FIG. 2). In each pair, the first and second transceivers communicate with each other via a respective channel. Also, the plural pairs of first and second transceivers perform communication simultaneously. Before performing communication, the communication system 20 performs an auto-negotiation procedure to determine master and slave transceivers, e.g. the first transceiver as the master transceiver and the second transceiver as the slave transceiver, or the second transceiver as the master transceiver and the first transceiver as the slave transceiver. FIG. 3 is a diagram showing the architecture within each transceiver of the communication system 20. As shown, each transceiver comprises a receiver 3 and a transmitter 4.

The transmitter 4 comprises a digital signal processing (DSP) circuit 41 for generating a digital transmission signal, which is sent to a digital-to-analog converter (DAC) 42 for converting into an analog transmission signal for transmission via the channel. The receiver 3 comprises an analog automatic gain controller (AAGC) 30, an analog-to-digital converter (ADC) 31, an interference cancellation circuit 32, a digital automatic gain controller (DAGC) 33, a channel estimator 34, a first-in-first-out (FIFO) register 35, a decision feedback equalizer (DFE) 36, a timing recovery circuit 37, a slicer 38, and adders 310, 311, 312 and 313. The operation of the above functional blocks is described as follows:

The strength of an analog input signal received by the receiver 3 is adjusted by the AAGC 30, and then the analog input signal is sent to the ADC for converting into a digital input signal. The interference cancellation circuit 32 comprises an echo canceller 321, plural near-end cross talk (NEXT) cancellers 322 and plural far-end cross talk (FEXT) cancellers 323. Since NEXTs and FEXTs result from the transmission signal within other channels and FIG. 2 shows four channels as example, FIG. 3 shows three NEXT cancellers 322 and three FEXT cancellers 323. The echo canceller 321 can generate an echo cancellation signal according to the digital transmission signal of the transmitter 4, so as to cancel the echo received by the receiver 3; the NEXT canceller 322 can generate a NEXT cancellation signal according to the digital transmission signal of another near-end transmitter, so as to cancel the NEXT received by the receiver 3. The adder 311 adds both the echo cancellation signal and the NEXT cancellation signal to generate a near-end interference cancellation signal (both echo and NEXT are near-end interferences), which is sent to the DAGC 33 for adjusting the signal strength (the function of DAGC 33 is described later). The adder 310 can subtract the strength-adjusted near-end interference cancellation signal from the digital input signal outputted by the ADC 31, so as to cancel the near-end interferences.

Since the characteristic of each channel may be different (e.g. the channel length may be different), skew may occur between the input signals received by the receiver 3 and other near-end receivers. Thus, the output of the adder 310 is sent into the FIFO register 35, which performs de-skew according to the estimated signal skew between each receiver provided by a skew estimator 39, so as to adjust the signal timing of the receiver 3 to be in line with that of other receivers. The de-skewed digital input signal is sent to the DFE 36, which includes a feed-forward equalizer (FFE) 361, a DAGC 362 and a feedback equalizer (FBE) 363. The FFE 361 is used to eliminate the pre-cursor component of inter-symbol interference resulted from the finite bandwidth of the channel, while the FBE 363 is used to eliminate the post-cursor component of inter-symbol interference. The FEXT canceller 363 can generate a FEXT cancellation signal according to a digital input signal of another near-end receiver after the digital input signal is performed near-end interference cancellation, timing recovery and channel equalization. Then, the FEXT cancellation signal is sent into the adder 312 to cancel the FEXT received by the receiver 3. The slicer 38 slices the digital input signal after being performed near-end and far-end interference cancellation, timing recovery and channel equalization, so as to determine the bit values of the data included in the digital input signal; the adder 313 calculates a difference value of the digital input signal between before and after the slicing, and feeds back the difference value to other related functional blocks for adaptation.

Besides, the channel estimator 34 is used to perform channel estimation. The function of the timing recovery circuit 37 is determined according to whether the receiver 3 belongs to the master or slave transceiver. If the receiver 3 belongs to the slave transceiver, then the timing recovery circuit 37 performs frequency recovery and phase recovery; if belongs to the master transceiver, then performs phase recovery only. This slave transceiver should track the frequency of the master transceiver, which thus does not need to perform frequency recovery.

Figure 4:
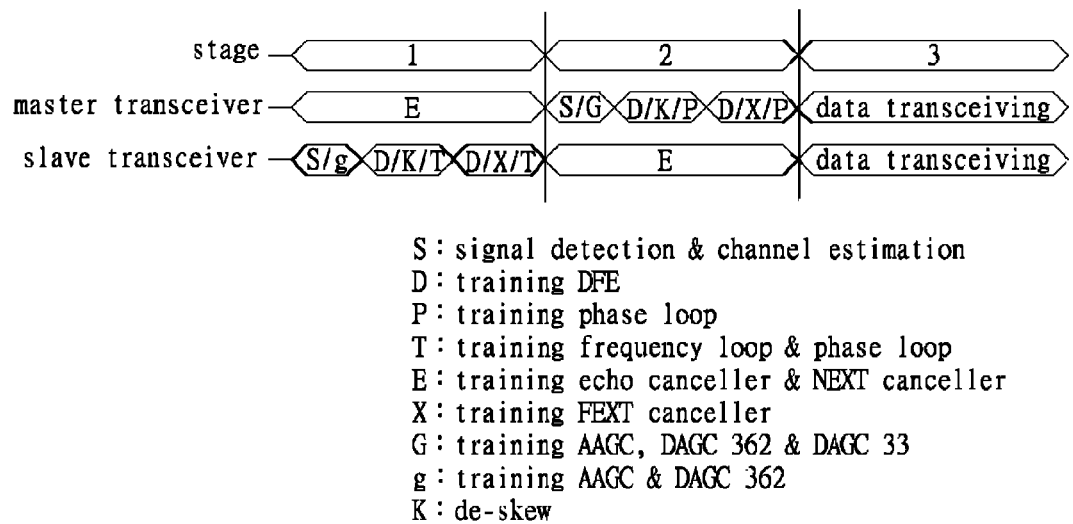
FIG. 4 shows an embodiment of the start-up procedure performed by the communication system in FIG. 2 according to the present invention.

In the communication system 20 of FIG. 2, before the first and second transceivers start data transceiving, the communication system 20 performs a start-up procedure to train the related functional blocks within the receiver 3 of the first and second transceivers such that the receiver 3 can correctly receive the data from a far-end transmitter. FIG. 4 shows an embodiment of the start-up procedure performed by the communication system 20 according to the present invention, wherein the start-up procedure includes three stages executed in different periods of time, and in the first and second stages, the master transceiver acts in a different way from the slave transceiver.

Before performing the start-up procedure, the first and second transceivers perform the above-mentioned auto-negotiation procedure by internal auto-negotiation circuits, so as to determine the master and slave transceivers. The auto-negotiation circuit is well-known to the person skilled in the art, and will not be described in detail here. Next, what the master and slave transceivers will perform in each stage of the start-up procedure in FIG. 4 is respectively described as below.

In the first stage, only the master transceiver issues signals, and the slave transceiver only performs signal reception. For example, if the communication system 20 is an Ethernet, the master transceiver will issue the idle sequence, which is used by the slave transceiver to train the related functional blocks of its own receiver 3. That is, the idle sequence is used as a training signal in the present invention. Since the master transceiver receives the echo resulted from the signal issued by itself and the NEXTs resulted from the signals issued by other master transceivers, the master transceiver can train the echo canceller 321 and the NEXT cancellers 322 (denoted as the letter E in the first stage of FIG. 4).

On the other hand, for the slave transceiver, the first stage includes three steps 1-1, 1-2 and 1-3 denoted as S/g, D/K/T and D/X/T respectively in the first stage of FIG. 4. In step 1-1, the slave transceiver performs signal detection to determine whether it receives a far-end signal (i.e. the idle sequence) from the master transceiver, and performs channel estimation to generate a channel estimation value when receiving the far-end signal. The channel estimation value can be a wire length if the channel is wired. The signal detection can prevent the slave transceiver from misjudging a received interference as the far-end signal transmitted by the master transceiver and erroneously starting to execute the first stage. That is, for the slave transceiver, the first stage is started after the far-end signal is detected. When performing the signal detection, the slave transceiver takes an absolute value of the received signal and then calculates an average of the absolute value. If the average is larger than a predetermined threshold, then the far-end signal is detected. After detecting the far-end signal, the slave transceiver performs the channel estimation to generate the channel estimation value. There are many ways to perform the channel estimation, and one of them can be seen in U.S. Pat. No. 7,203,256, "Ethernet channel estimation device and method", which takes the 1000 Base-T Ethernet as example for explanation, where the assignee of this application and the assignee of U.S. Pat. No. 7,203,256 are the same. Besides, in the 10G Base-T Ethernet, if the sampling rate is 800 MHz, then 38.4 MHz and 275.2 MHz can be used as the low and high frequency to estimate the wired length; if an over-sampling rate such as 1000 MHz is used, then 48 MHz and 344 MHz can be used as the low and high frequency.

Next, according to the channel estimation value, the slave transceiver trains the AAGC 30 and the DAGC 362 in the DFE 36, i.e. determines an analog gain value of the AAGC 30 and a digital gain value of the DAGC 362, where the latter is determined according to the former. It can be derived from FIG. 3 that the effective number of bits (ENOB) of the ADC 31 influences the performance of the receiver 3. Thus, the AAGC 30 located before the ADC 31 should make the analog input signal fall within the whole dynamic range of the ADC 31 without the clipping effect, and should also be easy to implement. In one embodiment, the following equation is utilized to implement the AAGC 30 in the receiver 3:

$$acc(n+1)=acc(n)+(rx\_signal(n)-thd) \qquad \mathrm{Eq}(1)$$

In Eq(1), acc is the output of the AAGC 30, rx_signal is the analog input signal received by the receiver 3, and thd is a threshold. When acc is larger than the threshold, the AAGC 30 is adjusted to a lower level, i.e. its analog gain value is decreased; when acc is smaller than the threshold, the AAGC 30 is adjusted to a higher level, i.e. its analog gain value is increased. When the communication system 20 is a wired communication system, the threshold in Eq(1) can be linearly adjusted according to different wired lengths of the channel such that the variation range of the analog input signal can fall within the dynamic range of the ADC 31. As mentioned above, the slave transceiver can estimate the wire length of the channel (i.e. the channel estimation value) by performing the channel estimation, so the threshold in Eq(1) can be determined according to the estimated wire length of the channel, and then the analog gain value of the AAGC 30 can be determined by Eq(1). After the analog gain value of the AAGC 30 is determined, the digital gain value of the DAGC 362 can be determined accordingly.

In step 1-2, the slave transceiver trains the timing recovery circuit 37 and the DFE 36 and performs de-skew to eliminate the skew between input signals of the slave transceiver and other slave transceivers. In one embodiment, since the timing recovery circuit 37 and the DFE 36 may influence each other such that their parameters can not converge to proper values in the training process, the slave transceiver trains the timing recovery circuit 37 and the DFE 36 in the following way so as to avoid the above problem: the slave transceiver first estimates a proper set of parameters for the DFE 36 according to the channel estimation value (e.g. the wired length of the channel) generated in step 1-1, and presets the set of parameters into the DFE 36; next, the slave transceiver starts to train the FFE 361 under the constraints of the predetermined ranges of the parameters of the DFE 36, and at the same time opens phase loop of the timing recovery circuit 37 for training. In this way, the parameters of the FFE 361 will converge to proper values quickly and the eye pattern will also open in a very short time. After the eye pattern opens, the slave transceiver trains the FBE 363 and frequency loop of the timing recovery circuit 37. By using the above technique, i.e. first training the simpler, less volatile FFE 361 and phase loop and then training the more complicated, volatile FBE 363 and frequency loop, the inter-influence between the DFE 36 and the timing recovery circuit 37 during the training process can be effectively avoided. After the DFE 36 and the timing recovery circuit 37 is trained (i.e. the eye pattern opens), the slave transceiver performs the de-skew to eliminate the skew among each slave transceiver. The de-skew is needed to perform only once during the whole start-up procedure.

In step 1-3, since the de-skew is performed in previous step 1-2, the slave transceiver can train the FEXT cancellers 323. Since the functional blocks in the receiver 3 may influence each other, the variation of the parameters of one functional block may influence the correctness of the already-set parameters of other functional blocks. Thus, after training the FEXT cancellers 323, the slave transceiver re-trains the timing recovery circuit 37 and the DFE 36.

After the second stage begins, the master and slave transceivers will continue to transmit signals to each other, not only the master transceiver as in the first stage. In the second stage, the master and slave transceivers exchange their actions performed in the first stage. That is, the slave transceiver trains the echo canceller 321 and the NEXT cancellers 322 in the interference cancellation circuit 32 (denoted as the letter E in the second stage of FIG. 4) and the master transceiver executes the steps 1-1~1-3 as described above, while some difference still exist:

(1) In the second stage, when training the timing recovery circuit 37, the master transceiver only trains the phase loop and does not train the frequency loop. The slave transceiver should track the frequency of the master transceiver, which thus does not need to perform frequency recovery, while the slave transceiver needs to perform both frequency recovery and phase recovery. Therefore, as shown in FIG. 4, the letter T (denoting the training of the frequency loop and phase loop) in the first stage is replaced by the letter P (denoting the training of the phase loop) in the second stage.

(2) In the second stage, the master transceiver still transmits signals as in the first stage, so it will receive the echo and the NEXTs. When the master transceiver is to adjust the gain values of the AAGC 30 and the DAGC 362 after performing the channel estimation, since the echo canceller 321 and the NEXT cancellers 322 have already been trained in the first stage, the master transceiver needs to adjust the gain value of the DAGC 33 correspondingly. This is because the strength of the near-end interference received by the receiver 3 will be adjusted by the AAGC 30, and if the gain value of the AAGC 30 is adjusted, then the strength of the near-end interference cancellation signal (i.e. the sum of the echo cancellation signal and the NEXT cancellation signals) will also need to be adjusted correspondingly, that is, if the analog gain value of the AAGC 30 is increased, the digital gain value of the DAGC 33 is also increased, and vice versa.

On the other hand, when the master transceiver performs the channel estimation in the second stage, since it still receives the echo and the NEXTs at this stage, the adder 310 will first subtract the near-end interference cancellation signal from the digital input signal outputted by the ADC 31, and then output the result to the channel estimator 34 for performing the channel estimation. In this manner, the accuracy of the channel estimation can be upgraded. For example, when the communication system 20 is a wired communication system, the ratio of a high frequency component and a low frequency component in the received far-end signal can be used to perform the channel estimation. If the near-end interference (including the echo and NEXT) is too strong, then the ratio of the high and low frequency components in the received far-end signal may become inaccurate. For example, in the 10G Base-T Ethernet, the near-end interference may be much larger than the far-end signal in the high frequency range. Thus, in one embodiment, in the second stage, the master transceiver first cancels the near-end interference from the input signal, and then sends the interference-canceled input signal to the channel estimator 34, so as to upgrade the accuracy of the channel estimation.

In the third stage, the communication system 20 starts data transceiving, and each transceiver can determine whether to re-train the functional blocks within the receiver 3 by monitoring its own signal-to-noise ratio (SNR). For example, when the SNR is lower than a predetermined threshold, re-training is performed to update the parameters of the related functional blocks. Each transceiver can also perform re-training for every period of time under the control of a built-in timer. In this manner, the re-training will not be performed all the time so as to save electric power.

The present invention also provides other ways of implementation, for instance, to add more stages to the three stages in FIG. 4, thereby obtaining better performance. In one embodiment, the communication system 20 is a 10G Base-T Ethernet, and the corresponding start-up procedure is the one shown in FIG. 4 plus two additional stages, as shown in FIG. 5, wherein the first and second stages are equal to the first and second stages in FIG. 4, the fifth stage is equal to the third stage in FIG. 4, and the third and fourth stages are newly-added stages. In the start-up procedure of FIG. 5, the first, second and fifth stages are explained as above, and what the master and slave transceivers will perform in the third and fourth stages is respectively described as below.

Figure 6:
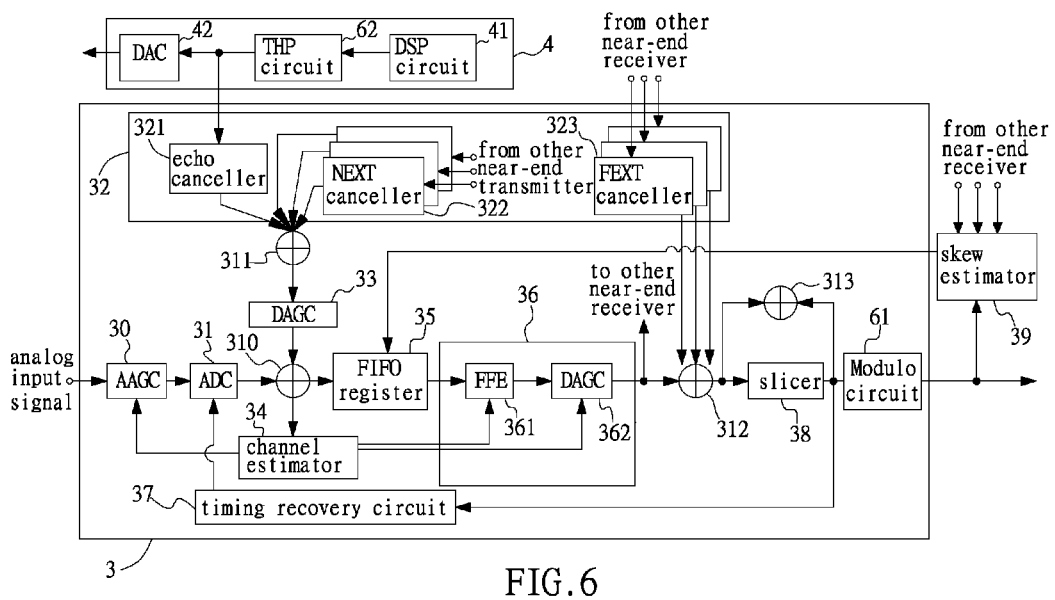
FIG. 6 is a diagram showing the architecture within each transceiver of the communication system in FIG. 2 after switching to the THP mode.

Before describing the third and fourth stages, the Tomlinson-Harashima Precoding (THP) mode adopted by the 10G Base-T Ethernet is explained first. The THP mode means that the master and slave transceivers need to exchange some of their parameters during the start-up process, and they should switch to the THP mode at the same predetermined time point. For the architecture in FIG. 3, the parameters of the FBE 363 are exchanged, and the architecture should be switch to the architecture in FIG. 6 after the exchange. In FIG. 6, for each transceiver, after the parameters of the FBE 363 of its own receiver 3 are sent to the other side, the FBE 363 is disabled and a Modulo circuit 61 is enabled; on the other hand, its own transmitter 4 enables a THP circuit 62 according to the FBE parameters sent from the other side. That is, the FBE 363 is equivalently replaced by the THP circuit 62 plus the Modulo circuit 61. The advantage is that since the FBE 363 is easy to cause the error propagation problem in the receiver 3, this problem can be effectively avoided by passing the correct FBE parameters to the transmitter of the other side and replacing the FBE 363 with the THP circuit 62 and the Modulo circuit 61.

Next, the third and fourth stages in FIG. 5 are described. It is notable that in the third and fourth stages, the master and slave transceivers perform the same actions except when the timing recovery circuit 37 is trained, the master transceiver only trains the phase loop (i.e. the letter P in FIG. 5) while the slave transceiver trains both the frequency loop and the phase loop (i.e. the letter T in FIG. 5). The third stage includes three steps 3-1, 3-2 and 3-3 denoted as G, D/X/P/E (or D/X/T/E) and F/B/X/P/E (or F/B/X/T/E) respectively in the third stage of FIG. 5. After the training in the first and second stages, the functional blocks in the master and slave transceivers have converged to the proper parameter values. Thus, in step 3-1, both the master and slave transceivers exchange their status of signal quality such as the SNR, so as to determine an optimal target power level for both sides to perform power back off simultaneously. When the transceiver performs the power back off, since the transmission power of the transmitter of the other side is changed, all the analog gain value and digital gain values of its own receiver need to be adjusted correspondingly: the analog gain value of the AAGC 30 is first adjusted, and then the digital gain values of the DAGCs 362 and 33 are correspondingly adjusted. For example, if the analog gain value of the AAGC 30 is adjusted to k times of the original, then the digital gain value of the DAGC 362 should be adjusted to 1/k times of the original and that of the DAGC 33 to k times of the original.

Next, in step 3-2, since the gain values of the AAGC 30 and the DAGCs 362, 33 have been adjusted, each canceller in the interference cancellation circuit 32, the timing recovery circuit 37 and the DFE 36 need re-training. Since each transceiver has been adjusted to the optimal power level at this time, each transceiver can reach the optimal SNR after the re-training.

Step 3-3 is executed to prepare for entering the fourth stage (i.e. switching to the THP mode). In order to switch to the THP mode, each transceiver should pass the parameters of the FBE 363 to the transceiver in the other side, but the number of bits required for the parameter of the THP circuit 62 may not be equal to that of the FBE parameter. If the number of bits of the FBE parameter is larger than that of the parameter of the THP circuit 62, then step 3-3 needs to be executed. In step 3-3, the parameter of the FBE 363 is first quantized as the parameter of the THP circuit 62, e.g. if the parameters of the FBE 363 and the THP circuit 62 are 12-bit and 8-bit respectively, then the four least significant bits (LSBs) of the FBE parameter are truncated and then the truncated FBE parameter is stopped for updating (denoted as the letter B in the third stage of FIG. 5). Since the FBE parameter is changed after the quantization, the parameters of the FFE 361 and the DAGC 362 also need re-training (denoted as the letter F in the third stage of FIG. 5); besides, each canceller in the interference cancellation circuit 32 and the timing recovery circuit 37 may also be influenced. Therefore, in step 3-3, all the influenced functional blocks need re-training to obtain updated parameter values. After the parameters in both the master and slave transceivers are updated, the master and slave transceivers exchange the truncated FBE parameter so as to enter the THP mode at the same time.

It is notable that when the power issued by the transmitter 4 of each transceiver is changed due to the power back off, the strength of the echo and NEXTs generated will be changed in the same direction such that the parameters of the related functional blocks in the receivers 3 of the transceiver and other near-end transceivers are also influenced. Thus, in the architectures of FIG. 3 and FIG. 6, the DAGC 33 is located closely after the echo canceller 321 and the NEXT cancellers 322 so as to adjust the gain value in response to the variation of the echo and NEXTs. In this manner, there is no need to respectively adjust the parameters of other functional blocks, thereby facilitating the convergence of the parameter values.

The fourth stage includes two steps 4-1 and 4-2 denoted as M and F/X/P/E (or F/X/T/E) respectively in the fourth stage of FIG. 5. Since the master and slave transceivers have exchanged the truncated FBE parameter in previous step 3-3, both sides enter the THP mode simultaneously in step 4-1 and switch to the architecture of FIG. 6 from that of FIG. 3, i.e. disable the FBE 363 and replace with the Modulo circuit 61 and the THP circuit 62. In step 4-2, other related functional blocks, i.e. the FFE 361, the DAGC 362, each canceller in the interference cancellation circuit 32 and the timing recovery circuit 37, are re-trained to assure that each transceiver can remain stable after switching to the new architecture. When the whole system is stable, the fifth stage is entered to perform data transceiving. Since the fifth stage is equal to the third stage in FIG. 4, it will not be described again here.

In the embodiments of the start-up procedure shown in FIG. 4 and FIG. 6, since the channel estimation is first performed to pre-estimate the parameters of the DFE 36, the whole training process of the receiver can be kept stable without being influenced by the interaction between the functional blocks, and thus the parameters of the functional blocks can converge to proper values in a faster speed.

In one embodiment, when the communication system 20 is an Ethernet, it can perform a corresponding start-up procedure according to the communication specification or protocol determined by an auto-negotiation procedure performed by two communicating sides. Several cases are respectively described as below:

(1) If the auto-negotiation procedure determines to use the 10G Base-T specification or protocol, then the start-up procedure in FIG. 5 is performed.

(2) If the auto-negotiation procedure determines to use the 1000 Base-T specification or protocol, then the corresponding start-up procedure includes the first, second and fifth stages in FIG. 5, where the FEXT cancellers need no training (i.e. the letter X in FIG. 5 can be ignored) since the FEXT is not significant in the 1000 Base-T Ethernet. There are many ways to perform the start-up procedure (initialization) of the 1000 Base-T specification, and one of them can be seen in U.S. application Ser. No. 10/698,530, "Initialization method for a network system", which takes the 1000 Base-T Ethernet as example for explanation, where the assignee of this application and the assignee of U.S. application Ser. No. 10/698, 530 are the same.

(3) If the 100 Base-T specification or protocol is determined to be used, then the corresponding start-up procedure includes the first, second and fifth stages in FIG. 5, where since the 100 Base-T Ethernet uses two channels to transmit and receive signal, respectively, the NEXT and FEXT are absent and there is no need to perform de-skew. Also, the echo is not significant. The start-up procedure of the 100 Base-T specification is well-know procedure. Therefore, the detailed description is omitted.

(4) If the 10 Base-T specification or protocol is determined to be used, then since the 10 Base-T Ethernet also uses only two channel to transmit and receive signal, respectively, the corresponding start-up procedure only includes that the receiver performs signal detection, and the start-up procedure of the 10 Base-T specification is well-know procedure. Therefore, the detailed description is omitted.

In the different communication specification, at least one of the blocks in FIG. 3 or FIG. 5 can be disabled/enabled, respectively, such that the power of the transceiver can be reduced.

Figure 7:
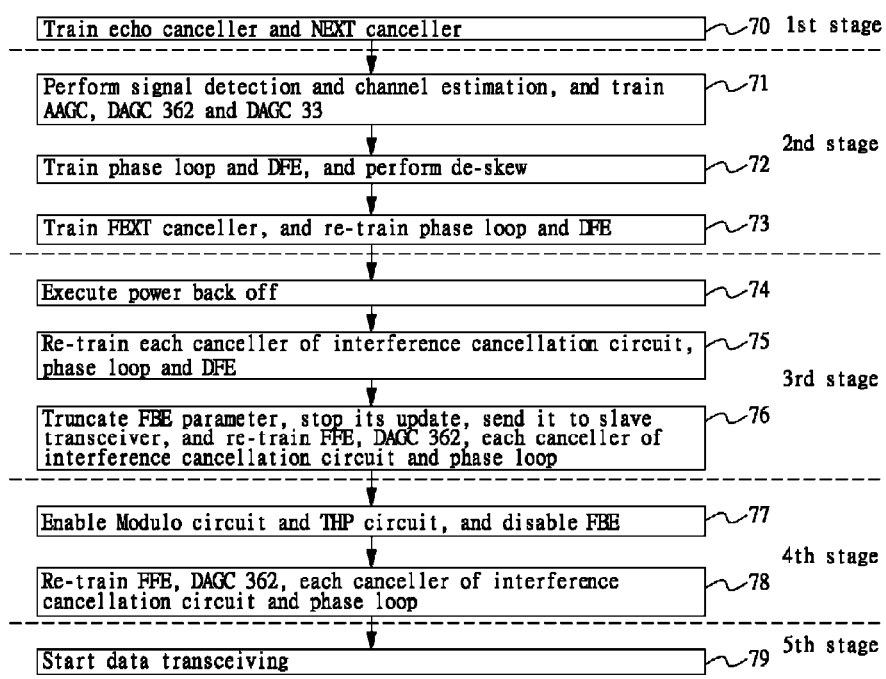
FIG. 7 and FIG. 8 are flow charts of the start-up method respectively used in the master and slave transceiver of the communication system according to an embodiment of the present invention.
Figure 8:
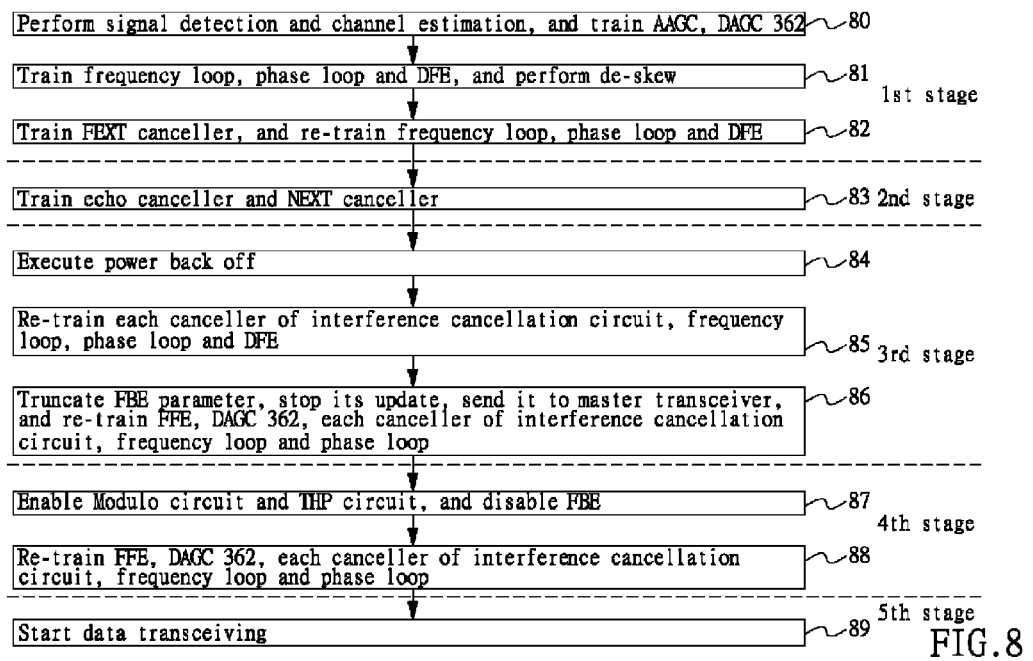

FIG. 7 and FIG. 8 are flow charts of the start-up method respectively used in the master and slave transceiver of the communication system 20 according to an embodiment of the present invention. The communication system 20 can be a 10G Base-T Ethernet. Since the steps in FIG. 7 and FIG. 8 have been explained in detail as above, the explanation for these steps is omitted here.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. A transceiver in a communication system comprising:
   an auto-negotiation circuit for performing an auto-negotiation procedure to determine whether the transceiver operates as a master or slave transceiver;
   a timing recovery circuit;
   an interference cancellation circuit;
   an analog automatic gain controller for adjusting strength of an input signal received by the transceiver;
   a digital automatic gain controller for adjusting strength of a near-end interference cancellation signal generated by the interference cancellation circuit; and
   an equalizer;
   wherein if the transceiver operates as a slave transceiver, the transceiver executes a first stage and a second stage when starting up; in the first stage, the transceiver performs channel estimation to generate a channel estimation value, presets parameters of the equalizer according to the channel estimation value, and trains the timing recovery circuit and the equalizer; in the second stage, the transceiver trains the interference cancellation circuit;
   wherein the first stage is before the second stage.

2. The transceiver of claim 1, wherein if the transceiver operates as the slave transceiver, the timing recovery circuit is used for performing frequency recovery and phase recovery.

3. The transceiver of claim 1, wherein the interference cancellation circuit comprises an echo canceller and a near-end cross talk canceller.

4. The transceiver of claim 3, wherein in the first stage, the transceiver further performs de-skew to eliminate skew between input signals of the transceiver and another transceiver.

5. The transceiver of claim 4, wherein the interference cancellation circuit further comprises a far-end cross talk canceller; in the first stage, the transceiver trains the far-end cross talk canceller after performing the de-skew; in the second stage, the transceiver trains the echo canceller and the near-end cross talk canceller of the interference cancellation circuit.

6. The transceiver of claim 1, wherein in the first stage, the transceiver determines an analog gain value of the analog automatic gain controller according to the channel estimation value.

7. The transceiver of claim 1, wherein after the second stage, the transceiver further executes a third stage to perform power back off.

8. The transceiver of claim 7, wherein the power back off comprises adjusting an analog gain value of the analog automatic gain controller and a digital gain value of the digital automatic gain controller.

9. A transceiver in a communication system comprising:
   an auto-negotiation circuit for performing an auto-negotiation procedure to determine whether the transceiver operates as a master or slave transceiver;
   a timing recovery circuit;
   an interference cancellation circuit, wherein the interference cancellation circuit comprises an echo canceller, a near-end cross talk canceller, and a far-end cross talk canceller; and
   an equalizer;
   wherein if the transceiver operates as a master transceiver, the transceiver executes a first stage and a second stage when starting up; in the first stage, the transceiver trains the interference cancellation circuit and further trains the echo canceller and the near-end cross talk canceller of the interference cancellation circuit; in the second stage, the transceiver performs channel estimation to generate a channel estimation value, presets parameters of the equalizer according to the channel estimation value, and trains the timing recovery circuit and the equalizer, wherein in the second stage, the transceiver further performs de-skew to eliminate skew between input signals of the transceiver and another transceiver and further trains the far-end cross talk canceller after performing the de-skew;
   wherein the first stage is before the second stage.

10. The transceiver of claim 9, wherein if the transceiver operates as the master transceiver, the timing recovery circuit is used for performing phase recovery.

11. The transceiver of claim 9, wherein in the second stage, the transceiver performs the channel estimation according to a difference between an input signal received by the transceiver and a near-end interference cancellation signal generated by the interference cancellation circuit.

12. The transceiver of claim 9, further comprising:
    an analog automatic gain controller for adjusting strength of an input signal received by the transceiver; and
    a digital automatic gain controller for adjusting strength of a near-end interference cancellation signal generated by the interference cancellation circuit.

13. The transceiver of claim 12, wherein in the second stage, the transceiver determines an analog gain value of the analog automatic gain controller and a digital gain value of the digital automatic gain controller according to the channel estimation value.

14. The transceiver of claim 12, wherein after the second stage, the transceiver further executes a third stage to perform power back off.

15. The transceiver of claim 14, wherein the power back off comprises adjusting an analog gain value of the analog automatic gain controller and a digital gain value of the digital automatic gain controller.

16. A start-up method used in a transceiver of a communication system, the transceiver comprising a timing recovery circuit, an interference cancellation circuit and an equalizer, the start-up method comprising:
    performing an auto-negotiation procedure to determine whether the transceiver operates as a master or slave transceiver;
    executing following steps if the transceiver operates as the slave transceiver:
    executing a first stage in which the timing recovery circuit and the equalizer are trained and de-skew is performed to eliminate skew between input signals of the transceiver and another transceiver; and
    executing a second stage in which the interference cancellation circuit is trained; and
    executing following steps if the transceiver operates as the master transceiver:
    executing the first stage in which the interference cancellation circuit is trained; and
    executing the second stage in which the timing recovery circuit and the equalizer are trained and de-skew is performed to eliminate skew between input signals of the transceiver and another transceiver;
    wherein the first stage is before the second stage.

17. The start-up method of claim 16, wherein if the transceiver operates as the slave transceiver, then in the second stage, an echo canceller and a near-end cross talk canceller in the interference cancellation circuit are trained; if the transceiver operates as the master transceiver, then in the first stage, the echo canceller and the near-end cross talk canceller in the interference cancellation circuit are trained.

18. The start-up method of claim 17, wherein if the transceiver operates as the slave transceiver, then in the first stage, a far-end cross talk canceller in the interference cancellation circuit is trained after the de-skew is performed; if the transceiver operates as the master transceiver, then in the second stage, the far-end cross talk canceller in the interference cancellation circuit is trained after the de-skew is performed.

19. A transceiver having at least two different start-up procedures for supporting at least two different communication specifications, the transceiver comprising:
an auto-negotiation circuit for performing an auto-negotiation procedure to determine which one of the at least two different communication specifications is used and whether the transceiver operates as a master or slave transceiver;
a timing recovery circuit;
an interference cancellation circuit; and
an equalizer;
wherein the transceiver performs a corresponding one of the at least two different start-up procedures according to which one of the at least two different communication specifications is used and whether the transceiver operates as the master or slave transceiver determined by the auto-negotiation procedure,
wherein the at least two different communication specifications comprises a desired specification of one of a 10G Base-T specification or a 1000 Base-T specification, and when the auto-negotiation procedure determines to use one of the desired specification and determines the transceiver to be the slave transceiver, the corresponding start-up procedure performed by the transceiver comprises:
executing a first stage in which the transceiver performs channel estimation to generate a channel estimation value, presets parameters of the equalizer according to the channel estimation value, and trains the timing recovery circuit and the equalizer;
executing a second stage in which the transceiver trains the interference cancellation circuit;
executing a third stage in which the transceiver performs power back off; and
executing a fourth stage in which the transceiver switches to a Tomlinson-Harashima Precoding mode.

20. The transceiver of claim 19, wherein in the first stage, the transceiver further performs de-skew to eliminate skew between input signals of the transceiver and another transceiver.

21. The transceiver of claim 20, wherein in the first stage, the transceiver trains a far-end cross talk canceller of the interference cancellation circuit after performing the de-skew;
in the second stage, the transceiver trains an echo canceller and a near-end cross talk canceller of the interference cancellation circuit.

22. The transceiver of claim 19, wherein the at least two different communication specifications comprises the one of the desired specification, and when the auto-negotiation procedure determines to use the one of the desired specification and determines the transceiver to be the master transceiver, the corresponding start-up procedure performed by the master transceiver comprises:
executing a first stage in which the master transceiver trains the interference cancellation circuit;
executing a second stage in which the master transceiver performs channel estimation to generate a channel estimation value, presets parameters of the equalizer according to the channel estimation value, and trains the timing recovery circuit and the equalizer;
executing a third stage in which the master transceiver performs power back off; and
executing a fourth stage in which the master transceiver switches to a Tomlinson-Harashima Precoding mode.

23. The transceiver of claim 22, wherein in the second stage, the master transceiver further performs de-skew to eliminate skew between input signals of the master transceiver and another transceiver.

24. The transceiver of claim 23, wherein in the second stage, the master transceiver trains a far-end cross talk canceller of the interference cancellation circuit after performing the de-skew; in the first stage, the master transceiver trains an echo canceller and a near-end cross talk canceller of the interference cancellation circuit.

25. The transceiver of claim 19, wherein the at least two different communication specifications comprises another of the desired a specification, and when the auto-negotiation procedure determines to use the another of the desired master specification and determines the transceiver to be the slave transceiver, the corresponding start-up procedure performed by the transceiver comprises:
executing a first stage in which the transceiver performs channel estimation to generate a channel estimation value, presets parameters of the equalizer according to the channel estimation value, and trains the timing recovery circuit and the equalizer; and
executing a second stage in which the transceiver trains the interference cancellation circuit.

26. The transceiver of claim 25, wherein the interference cancellation circuit comprises an echo canceller and a near-end cross talk canceller.

27. The transceiver of claim 19, wherein the at least two different communication specifications comprises the another of the desired a specification, and when the auto-negotiation procedure determines to use the another of the desired specification and determines the transceiver to be the master transceiver, the corresponding start-up procedure performed by the transceiver comprises:
executing a first stage in which the transceiver trains the interference cancellation circuit; and
executing a second stage in which the transceiver performs channel estimation to generate a channel estimation value, presets parameters of the equalizer according to the channel estimation value, and trains the timing recovery circuit and the equalizer.

* * * * *